United States Patent [19]

Houlihan

[11] 3,759,934

[45] Sept. 18, 1973

[54] 2,3 OR 4-PYRIDINEMETHANOL-ALPHA-SUBSTITUTED OR UNSUBSTITUTED PHENYLS-ALPHA-(2 OR 3-ALKOXY-1-NAPHTHYLS)

[75] Inventor: William J. Houlihan, Mountain Lakes, N.J.

[73] Assignee: Sandoz-Wander, Inc., Hanover, N.J.

[22] Filed: Dec. 9, 1970

[21] Appl. No.: 96,667

[52] U.S. Cl.......... 260/297 B, 260/295 S, 424/263, 424/266
[51] Int. Cl............................................. C07d 31/28
[58] Field of Search...................... 260/295 S, 297 B

[56] References Cited
OTHER PUBLICATIONS

Burger, Medicinal Chemistry, Third Edition, Part Two, Wiley Interscience, Page 1147–1150 (1969) RS 403 B8

*Primary Examiner*—Alan L. Rotman
*Attorney*—Gerald D. Sharkin, Frederick H. Weinfeldt, Robert S. Honor, Walter F. Jewell and Richard E. Vila

[57] ABSTRACT

2,3 Or 4-pyridinemethanol-α-substituted or unsubstituted phenyls-α-(2 or 3-alkoxy-1-naphthyls), e.g., 4-pyridinemethanol-α-phenyl-α-(2-methoxy-1-naphthyl), prepared by treating a 1-lithium-2-methoxynaphthalene with a 4-pyridyl phenyl ketone. The compounds are useful as hypolipidemic agents.

13 Claims, No Drawings

2,3 OR 4-PYRIDINEMETHANOL-ALPHA-SUBSTITUTED OR UNSUBSTITUTED PHENYLS-ALPHA-(2 OR 3-ALKOXY-1-NAPHTHYLS)

This invention relates to pyridinemethanol-α-phenyls-α-(2 or 3-alkoxy-1-naphthyls). More particularly it relates to 2,3 or 4-pyridinemethanol-α-substituted or unsubstituted phenyls-α-(2 or 3-alkoxy-1- or 2-naphthyls) acid addition salts thereof, intermediates thereof, and to processes for their preparation.

The compounds of this invention may be represented by the following structural formula:

(I)

where Z is

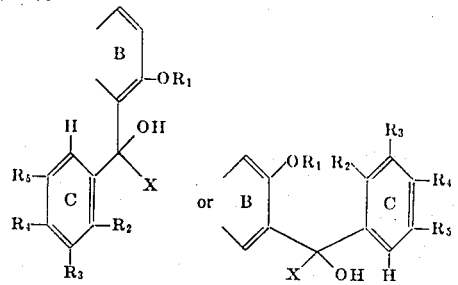

where X is

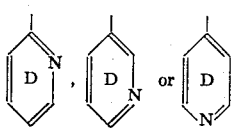

$R_1$ is straight chain lower alkyl having 1 to 4 carbon atoms, e.g., methyl, ethyl, propyl or butyl, $R_2$, $R_3$, $R_4$ and $R_5$ are independently hydrogen, halo having an atomic weight of 19 to 36, straight chain lower alkyl having 1 to 4 carbon atoms, e.g., methyl, ethyl, propyl, or butyl, straight chain lower alkoxy having 1 to 4 carbon atoms, e.g., methoxy, ethoxy, propoxy or butoxy, or $R_2$ and $R_3$, $R_3$ and $R_4$ or $R_4$ and $R_5$ together are methylenedioxy. provided that the maximum number of substituents or ring C other than hydrogen is two.

The compounds of formula (I) may also be represented by the following structural formulas:

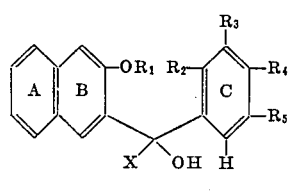

(Ia)

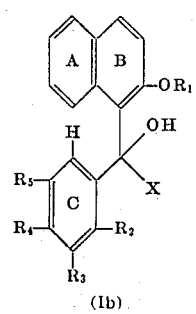

(Ib)

where $R_1$, $R_2$, $R_3$, $R_4$, $R_5$ and X have the above-stated significance.

The compounds of formulas (Ia) and (Ib) may be prepared by the following reaction scheme A:

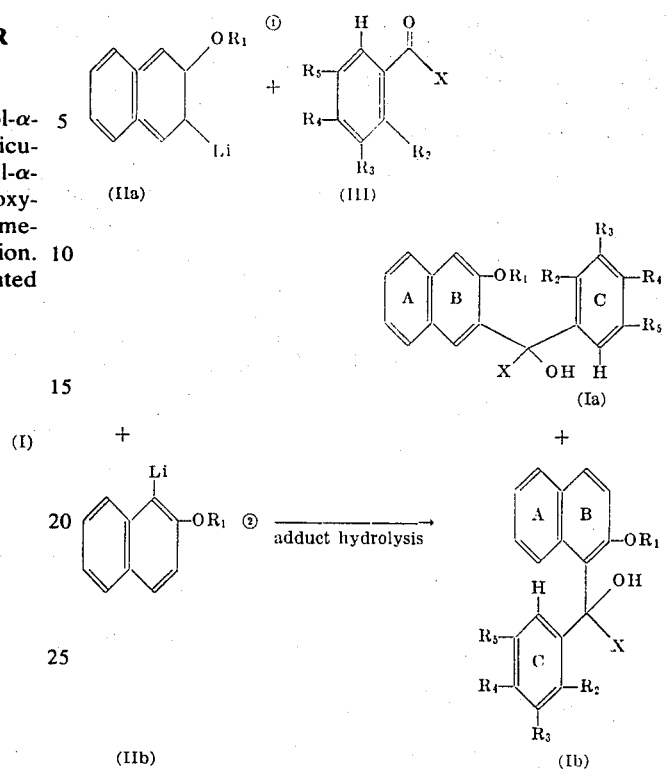

where $R_1$, $R_2$, $R_3$, $R_4$, $R_5$ and X have the above-stated significance.

The compounds of formulas (Ia) and (Ib) are prepared by treating a mixture of 1 and 3-lithium-2-alkoxynaphthalenes of formulas (IIa) and (IIb), with a pyridyl phenyl ketone of formula (III) under an inert atmosphere, e.g., nitrogen, in an inert solvent such as diethylether, tetrahydrofuran, pentane, hexane and the like, at a temperature of from −10° to 35° C., preferably 15° to 25° C. for about 0.5 to 24 hours, and subsequently hydrolyzing the resulting adduct, preferably with aqueous ammonium chloride. Compound (III) is preferably added in an inert solvent (as described above) to a cold (-5° to 5° C.) inert solvent solution of compounds IIa and IIb. Neither the solvents nor the temperatures used are critical.

The compounds of formula (Ia) may also be prepared by the following reaction scheme B:

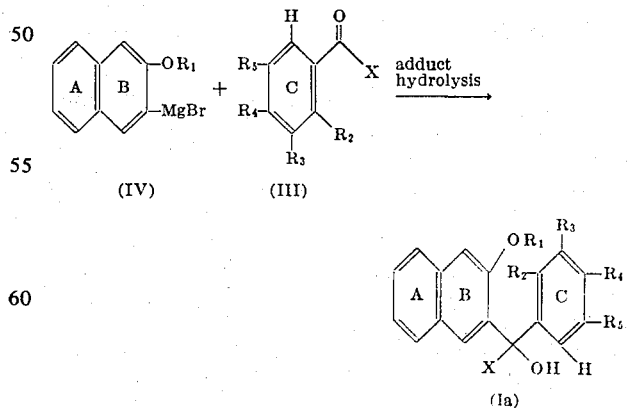

wherein $R_1$, $R_2$, $R_3$, $R_4$, $R_5$ and X have the above-stated significance.

The compounds of formula (Ia) are prepared by treating a compound of formula (IV) with a substituted benzoylpyridine of formula (III) in an inert atmosphere, in an inert solvent, under the reaction conditions, as indicated in scheme A.

the compounds of formula (Ib) may also be prepared by the following reaction scheme C:

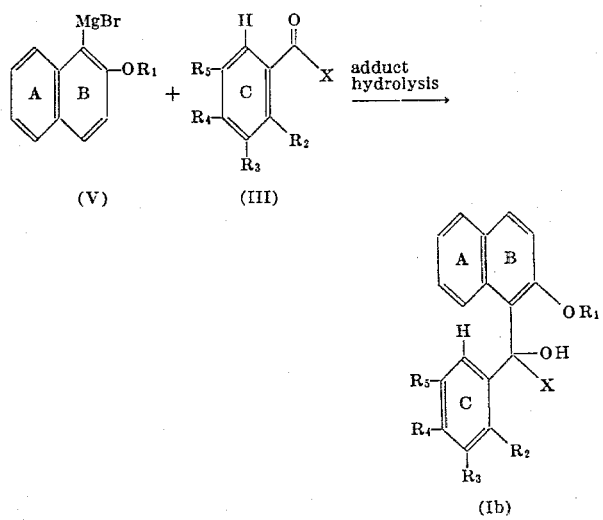

wherein $R_1$, $R_2$, $R_3$, $R_4$, $R_5$ and X have the above-stated significance.

The compounds of formula (Ib) are prepared by treating a compound of formula (V) with a substituted benzoylpyridine of formula (III) in an inert atmosphere, in an inert solvent under the reaction conditions, as indicated in Scheme A.

The compounds of formulas (Ia) and (Ib) may be prepared in acid addition salt form, such as the hydrochloride, by conventional methods, such as suspending the compound in alcohol or water and treating with the appropriate acid. When it is desired to convert such salts to the corresponding free bases, conventional techniques may be utilized, e.g., dissolution of the salt in water and precipitation using a base such as sodium hydroxide.

The compounds of formulas (Ia) and (Ib) may be recovered using conventional recovery techniques such as crystallization.

Certain of the compounds of formulas (IIa), (IIb), (III), (IV) and (V) are known and may be prepared according to methods disclosed in the literature. These compounds of formulas (IIa), (IIb), (III), (IV) and (V) not specifically disclosed are prepared according to analogous methods from known materials.

The preferred process for the preparation of the compounds of formula (Ia) is scheme A, and the preferred process for the preparation of the compounds of formula (Ib) is scheme C.

The compounds of formulas (Ia) and (Ib) are useful because they possess pharmacological activity in animals. In particular, the compounds are useful as hypolipidemic agents, as indicated by tests on a group of white rats which are given typically 60 mg/kg of body weight per diem of the active material orally, for 6 days, followed by extraction with isopropanol of serum or plasma after anesthetizing the rats with sodium hexobarbital, and then noting the cholesterol content as compared to that of a control group. The cholesterol content is determined by the Technicon method N24a. For such usage, the compounds may be administered orally or parenterally as such or admixed with conventional pharmaceutical carriers.

The compounds of formula (I) may be similarly administered in the form of their non-toxic pharmaceutically acceptable acid addition salts. Representative of such salts are the hydrobromide, sulfate, phosphate, succinate, benzoate, acetate and the like. Such salts possess the same order of activity as the free base.

The dosage administered may vary depending on the particular compound employed, the therapy desired and the severity of the condition being treated. In general, satisfactory results are obtained when administered at a daily dosage of from about 2 to 200 mg/kg of animal body weight, preferably given in divided doses, 2 to 4 times a day, or in sustained release form. For most larger mammals (e.g., primates) the total daily dosage is from about 150 milligrams to about 2,000 milligrams of the compound and the dosage forms suitable for internal use comprise from about 75 milligrams to about 500 milligrams of active compound in intimate mixture with a solid or liquid pharmaceutically acceptable carrier or diluent.

A representative formulation suitable for oral administration in a capsule prepared by standard techniques which contains the following:

| Ingredients | Parts by Weight |
|---|---|
| 4-pyridinemethanol-α-phenyl-α-(3-methoxy-2-naphthyl) | 50 |
| Inert filler (e.g., starch, kaolin, lactose, etc.) | 250 |

EXAMPLE I 4-pyridinemethanol-α-phenyl-α-(3-methoxy-2-naphthyl)

Step A

Charge to a flask equipped with a condenser, stirrer, dropping funnel, and maintained under a nitrogen atmosphere 39.5 g (0.25 mole) of 2-methoxynaphthalene and 200 ml of anhydrous tetrahydrofuran. Stir at room temperature and add in about 0.5 hour 155 ml (0.25 mole) of n-butyllithium in hexane. After an additional 3 hours of stirring at room temperature in an icebath add over a 45 minute period a solution of 55.0 g (0.30 mole) of 4-pyridyl phenyl ketone in 150 ml of tetrahydrofuran. Stir overnight at room temperature and then to the resultant adduct add about 50 ml saturated ammonium chloride solution. Stir for an additional 2 hours and then filter off the solids that had formed. Crystallization of the solids gave 36.4 g of the product of 4-pyridinemethanol-α-phenyl-α-(3-methoxy-2-naphthyl), mp 193°–194° C. (a compound of formula (Ia)

Step B

By following the above conditions and in place of 2-methoxynaphthalene starting with 2-ethoxynaphthalene and in place of 4-pyridyl phenyl ketone starting with 2-pyridyl phenyl ketone the product (of formula Ia) 2-pyridinemethanol-α-phenyl-α-(3-ethoxy-2-naphthyl), m.p. 107°–108°C. is obtained.

EXAMPLE II 4-pyridinemethanol-α-phenyl-α-(2-methoxy-1-naphthyl)

Step A

The ether-tetrahydrofuran filtrate of Example I, Step A was concentrated in vacuo and the residue (28.1 g) was chromatographed on silica gel ($CHCl_3$ eluent) and crystallized in pentane to give the product 4-pyridinemethanol-α-phenyl-α-(2-methoxy-1-napthyl), mp 170° – 171° C. (a compound of formula Ib)

Step B

By using the above conditions and in place of the ethertetrahydrofuran filtrate of Example 1, Step A and starting with the ethertetrahydrofuran filtrate of Example 1, Step B the product (of formula Ib) 2-pyridinemethanol-α-phenyl-α-(2-ethoxy-1-naphthyl), 175°–177° C. is obtained.

EXAMPLE III

By using the conditions of Example I, Step A and in place of 2-methoxynaphthalene, and starting with 2-ethoxynaphthalene, and in place of 4-pyridyl phenyl ketone, and starting with 1. 3-pyridyl 2,4-dichlorophenyl ketone
2. 2-pyridyl 3,5-dimethylphenyl ketone
3. 2-pyridyl 3,5-dichlorophenyl ketone
4. 2-pyridyl 2,4-dimethylphenyl ketone
5. 2-pyridyl 2,4-dimethoxyphenyl ketone
6. 2-pyridyl 3,5-dimethoxyphenyl ketone or
7. 2-pyridyl 2,3-methylenedioxyphenyl ketone, the following products (of formula Ia) are obtained:
1. 3-pyridinemethanol-α-2,4-dichlorophenyl-α-(3-ethoxy-2-naphthyl)
2. 2-pyridinemethanol-α-3,5-dimethoxyphenyl-α-(3-ethoxy-2-naphthyl)
3. 2-pyridinemethanol-α-3,5-dichlorophenyl-α-(3-ethoxy-2-naphthyl)
4. 2-pyridinemethanol-α-2,4-dimethylphenyl-α-(3-ethoxy-2-naphthyl)
5. 2-pyridinemethanol-α-2,4-dimethoxyphenyl-α-(3-ethoxy-2-naphthyl)
6. 2-pyridinemethanol-α-3,5-dimethoxyphenyl-α-(3-ethoxy-2-naphthyl) or
7. 2-pyridinemethanol-α-2,3-methylenedioxyphenyl-α-(3-ethoxy-2-naphthyl).

EXAMPLE IV

By using conditions of Example II, Step A and in place of the ethertetrahydrofuran filtrate of Example I, Step A and starting with the appropriate ether tetrahydrofuran filtrate of Example III, the following products (of formula Ib) are obtained:

1. 3-pyridinemethanol-α-2,4-dichlorophenyl-α-(2-ethoxy-1-naphthyl)
2. 2-pyridinemethanol-α-3,5-dimethoxyphenyl-α-(2-ethoxy-1-naphthyl)
3. 2-pyridinemethanol-α-3,5-dichlorophenyl-α-(2-ethoxy-1-naphthyl)
4. 2-pyridinemethanol-α-2,4-dimethylphenyl-α-(2-ethoxy-1-naphthyl)
5. 2-pyridinemethanol-α-2,4-dimethoxyphenyl-α-(2-ethoxy-1-naphthyl)
6. 2-pyridinemethanol-α-3,5-dimethoxyphenyl-α-(2-ethoxy-1-naphthyl) or
7. 2-pyridinemethanol-α-2,3-methylenedioxyphenyl-α-(2-ethoxy-1-naphthyl).

EXAMPLE V

Charge to a flask equipped with a condenser, stirrer, dropping funnel, and maintained under a nitrogen atmosphere 4.6 g. (0.20 mole) of magnesium in 250 ml. of dry tetrahydrofuran. Add dropwise a solution of 50.2 (0.2 mole) of 3-bromo-2-ethoxynaphthalene in 250 ml. of dry tetrahydrofuran. After the Grignard formation is complete the system is treated with 27.5 g. (0.15 mole) of 2-pyridyl phenyl ketone in 100 ml. of dry tetrahydrofuran. Stir the reaction mixture at room temperature overnight, then cool in ice bath. To the resulting adduct add dropwise 50 ml. of saturated ammonium chloride, followed by 50 gms. of anhydrous sodium sulfate, filter of the salts, remove the solvent and crystallize the resultant residue in pentane to obtain the product (of formula Ia) 2-pyridinemethanol-α-phenyl-α-(3-ethoxy-2-naphthyl) m.p. 107°–108° C.

EXAMPLE VI

Charge to a flask equipped with a condenser, stirrer, dropping funnel, and maintained under a nitrogen atmosphere 4.6 g. (0.20 mole) of magnesium in 250 ml. of dry tetrahydrofuran. Add dropwise a solution of 50.2 (0.2 mole) of 1-bromo-2-ethoxynaphthalene in 250 ml. of dry tetrahydrofuran. After the Grignard formation is complete the system is treated with 27.5 g. (0.15 mole) of 2-pyridyl phenyl ketone in 100 ml. of dry tetrahydrofuran. Stir the reaction mixture at room temperature overnight, then cool in an ice bath. To the resulting adduct add dropwise 50 ml. of saturated ammonium chloride, followed by 50 gms. of anhydrous sodium sulfate, filter of the salts, remove the solvent and crystallize the resultant residue in pentane to obtain the product (of formula Ib) 2-pyridinemethanol-α-phenyl-α-(2-methoxy-1-naphthyl), m.p. 175°–177° C.

What is claimed is:

1. A compound of the formula

where Z is

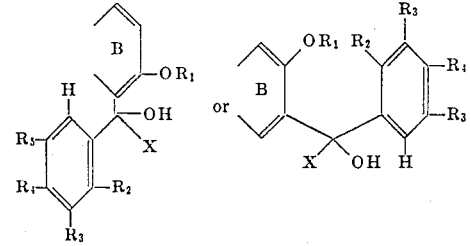

where X is

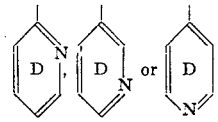

$R_1$ is straight chain lower alkyl having 1 to 4 carbon atoms;

$R_2$, $R_3$, $R_4$ and $R_5$ are independently hydrogen, halo having an atomic weight of 19 to 36, straight chain lower alkyl having 1 to 4 carbons atoms, or straight chain lower alkoxy having 1 to 4 carbon atoms or $R_2$ and $R_3$, $R_3$ and $R_4$ or $R_4$ and $R_5$ together are methylenedioxy, provided that the maximum number of substituents on ring C other than hydrogen is two, or a pharmaceutically acceptable acid addition salt thereof.

2. A compound of claim 1 of the formula

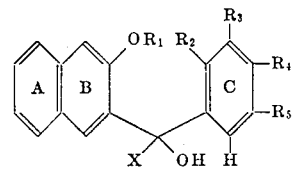

where $R_1$, $R_2$, $R_3$, $R_4$, $R_5$ and X are as defined in claim 1, or a pharmaceutical acid addition salt thereof.

3. A compound of claim 2 wherein X is

4. A compound of claim 2 wherein X is

5. A compound of claim 2 wherein X is

6. A compound of claim 1 of the formula

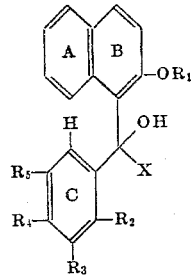

wherein $R_1$, $R_2$, $R_3$, $R_4$, $R_5$ and X are as defined in claim 1, or a pharmaceutical acid addition salt thereof.

7. A compound of claim 6 wherein X is

8. A compound of claim 6 wherein X is

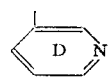

9. A compound of claim 6 wherein X is

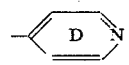

10. The compound of claim 1 which is 4-pyridinemethanol-α-phenyl-α-(3-methoxy-2-naphthyl).

11. The compound of claim 1 which is 4-pyridinemethanol-α-phenyl-α-(2-methoxy-1-naphthyl).

12. The compound of claim 1 which is 2-pyridinemethanol-α-phenyl-α-(3-ethoxy-2-naphthyl).

13. The compound of claim 1 which is 2-pyridinemethanol-α-phenyl-α-(2-ethoxy-1-naphthyl).

* * * * *